Nov. 6, 1928.
J. J. SMITH
1,690,139
EYEGLASS FRAME
Filed May 27, 1926    2 Sheets-Sheet 1
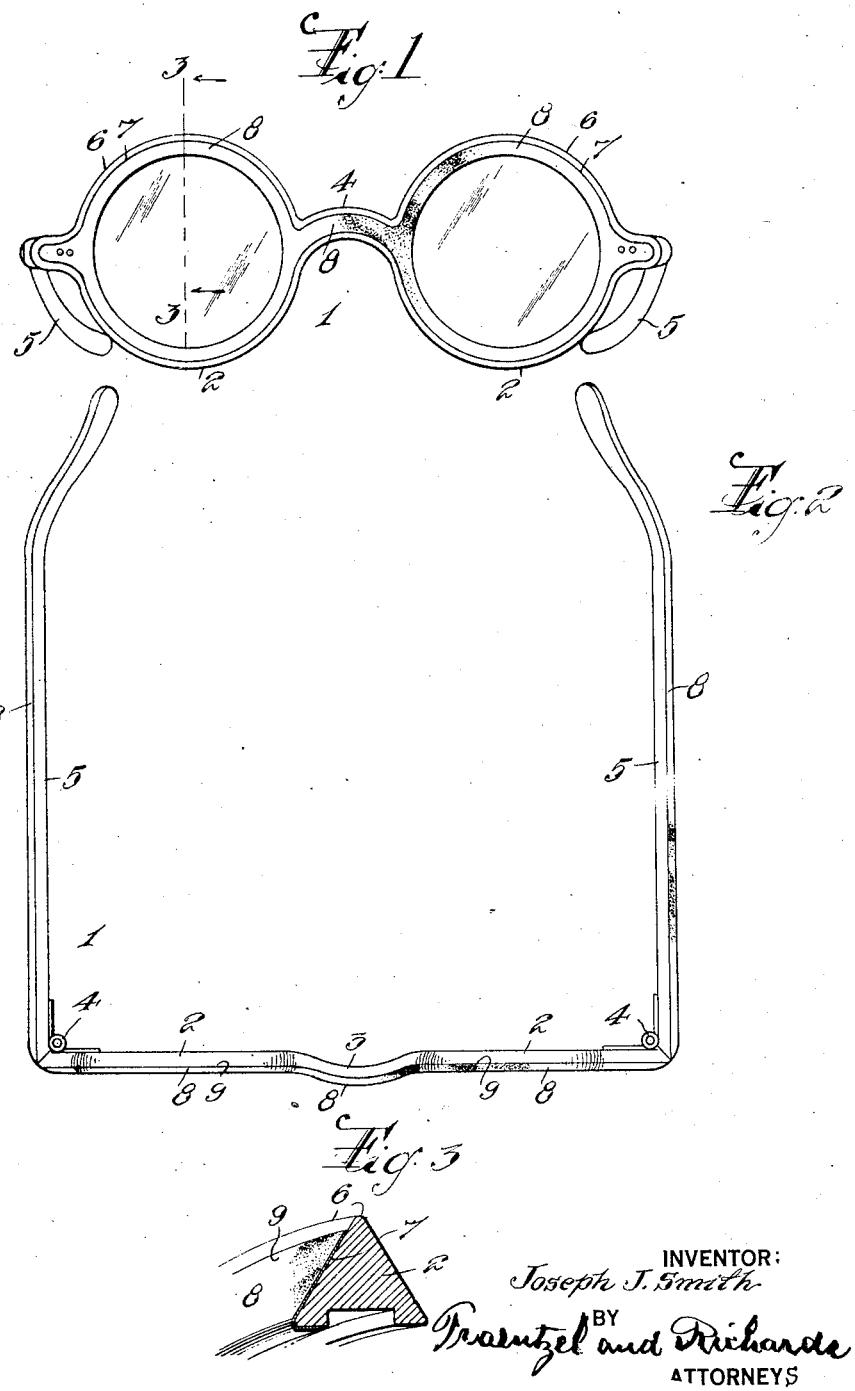
INVENTOR:
Joseph J. Smith
BY Fraentzel and Richards
ATTORNEYS Nov. 6, 1928.   J. J. SMITH   1,690,139
EYEGLASS FRAME
Filed May 27, 1926   2 Sheets-Sheet 2
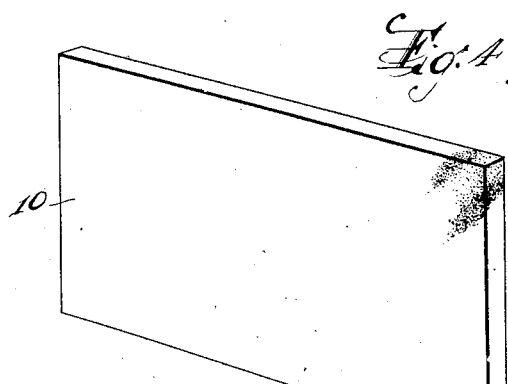
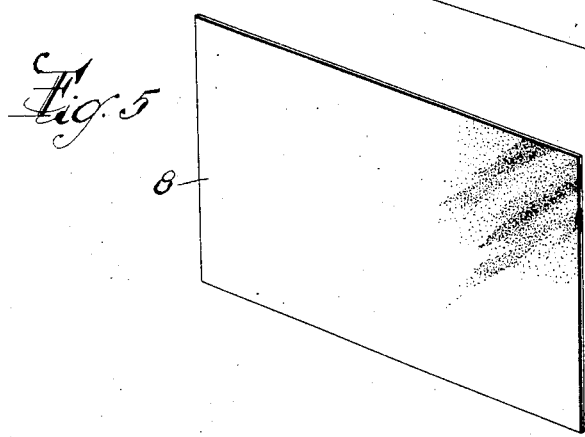
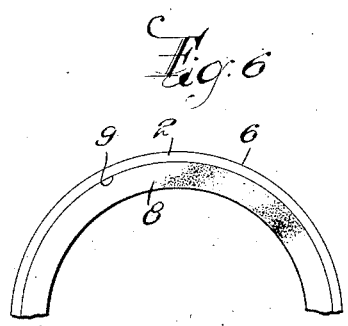
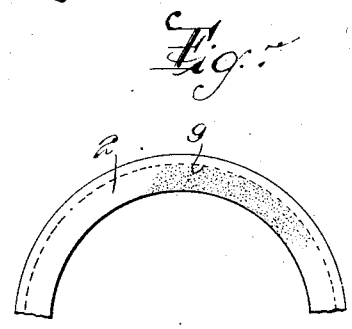
INVENTOR:
Joseph J. Smith.
BY Fraentzel and Richards,
ATTORNEYS Patented Nov. 6, 1928.

1,690,139

UNITED STATES PATENT OFFICE.

JOSEPH J. SMITH, OF NEWARK, NEW JERSEY, ASSIGNOR TO NEWARK NOVELOID COMPANY, A CORPORATION OF NEW JERSEY.

EYEGLASS FRAME.

Application filed May 27, 1926. Serial No. 111,955.

This invention relates, generally, to improvements in eye-glass frames; and, the present invention has reference, more particularly, to that class of eye-glass frames composed of a combination of at least two plastic compositions or materials, as celluloid, zylonite, or analogous compositions, superimposed upon one another, of such light transmitting quality as to produce a semi-transparent effect, so as to prevent glare, and to provide a restful effect to the eyes.

The present invention, therefore, has for its principal object to provide an eye-glass frame composed of a combination of plastic compositions, superimposed upon one another, with a view of producing an observable color-effect of pleasing appearance, but calculated to avoid opaque obstruction to the wearer's vision, as well as to prevent glare and eye-strain, and hence is restful and non-injurious to the eyes of the wearer.

I am fully aware, that eye-glass frames made of plastic compositions in a plurality of colors is old, but I have found that these old combinations produce effects which are injurious to the eyes, since such combinations of colors permit glare, and produce dark spots or opaque obstructions, or other color-spots due to the color-combinations, which obtrude themselves adjacent to the line of vision of the wearer, and consequently produce eye-strain.

I have made tests of all the different compositions in order to determine the most scientifically non-irratative to the eye.

In making the test, consideration was given to the effect on the sight of an opaque or dark object held continuously near the line of vision.

Eyes which need the aid of glasses, should be scrupulously guarded against strain. Heavy dark frames, encircling lenses, obstruct the field of vision templely, nasally, above and below. This is a constant source of irritation to the eye which may help to cause asthenopia or add to the already asthenopic eye.

With the cherry tutone, shell, wine, demi-amber, black tutone, and solid crystal, as well as other solid colors, I found more discomfort in watching moving objects than with the tutone composite which I recommend "demiamber on crystal."

Light has a different effect on each of these frames, since, when a ray of light meets an opaque body, it is either absorbed or reflected. When it meets a translucent medium, some of it is absorbed and some reflected. Reflection is more or less harmful to the eye because it will cause direct full bright rays to fall upon the retina.

It is incumbent that a correct frame has, as its medium, some composition which will absorb, that is to soften the light.

I found the "demiamber on crystal" ideal, for the reason that in the fusion of colors from dark to light to almost transparent, the light is refracted in its passage from a rarer to a denser medium, and vice versa.

The nervous visual apparatus is easily fatigued, and hence, it is necessary that strain be reduced in eye sufferers as much as possible. This can be accomplished by the manufacture of frames scientifically beneficial to the eye.

The present invention consists therefore in the herein-described eye-glass frame composed of at least a combination of two plastic compositions or materials, consisting of demi-amber superimposed upon crystal, the demi-amber being translucent and the crystal substantially transparent.

The invention is illustrated in the accompanying drawings, in which:—

Figures 1 and 2 are a front view and plan, respectively, of an eye-glass frame embodying the principles of the present invention, and Figure 3 is a sectional perspective view taken on line 3—3 in said Figure 1, said view being made on an enlarged scale.

Figures 4 and 5 are perspective views of portions of the plastic composition, showing the demi-amber effects; and Figures 6 and 7 are a front and rear view, respectively, of fragmentary portions of one of the lens-receiving rims composed of a composition of demi-amber mounted upon a composition of crystal, showing the toning color effects, said views being made on an enlarged scale.

Similar characters of reference are employed in the said above described views, to indicate corresponding parts.

Referring now to the said drawings, the reference-character 1 indicates a complete eye-glass frame, showing one embodiment of the principles of the present invention, the same comprising the lens-receiving rims 2, connected by the nose-guard 3, and pivotally connected with said rims, as at 4, are the temples 5. As represented in the several figures of the drawings, and as will be seen more particularly from Figure 3, the main portions of the rims 2, the nose-guard, and the temples are usually triangular in cross-section, the edge 6 being slightly rounded. These main portions are made of a plastic composition of crystal or substantially transparent effect, and superimposed upon the surface 7 of said portions is a layer of plastic composition 8 of demi-amber or translucent effect, the marginal edge 9 of which terminates below the rounded periphery 6, as shown.

Referring now to Figures 4 and 5 in which are shown such translucent demi-amber composition, Figure 4 illustrates a block 10 of any suitable thickness from which the sheets 8 of demi-amber are cut. In Figure 6 is illustrated a fragmentary portion of the lens-receiving rim, when viewed from the front, and in Figure 7 is illustrated a similar portion of the lens, when viewed from the back, said views showing the color effects and semi-transparent effect which prevents the glare and is so restful to the eyes.

As has been stated, I have found that translucent demi-amber upon transparent crystal produces the desired results, for the reason that in the fusion of colors from dark to light to almost transparent, the light is refracted in its passage from a rarer to a denser medium, and vice versa, from the denser to the rarer medium, so that there is a diffusion of the light, while nevertheless a definite demarcation of the frame is apparent to an observer of the wearer thereof.

I claim:—

An eye-glass frame of plastic material having lens rim portions of substantially triangular cross sectional shape with the apex directed toward the outer peripheries thereof, the rearward angular portions coincident to the rearward lateral peripheries of said rim portions and including said outwardly directed apex portions consisting of transparent material, and the front angular portion coincident to the forward lateral peripheries of said rim portions consisting in a translucent demi-amber section, all whereby light traversing said rim portions toward the eyes of the wearer is diffused and softened while a definite conventional appearance of the frame is retained.

In testimony, that I claim the invention set forth above I have hereunto set my hand this 20th day of May, 1926.

JOSEPH J. SMITH.